United States Patent [19]

Conkling et al.

[11] 4,199,817
[45] Apr. 22, 1980

[54] DIGITAL AVERAGER

[75] Inventors: Charles T. Conkling, Wyandanch; Donald B. Scarl, East Massapequa, both of N.Y.

[73] Assignee: Conkling Laboratories, Massapequa, N.Y.

[21] Appl. No.: 890,769

[22] Filed: Mar. 27, 1978

Related U.S. Application Data

[63] Continuation-in-part of Ser. No. 762,553, Jan. 25, 1977, abandoned.

[51] Int. Cl.² ............... G06F 15/20; G06F 15/36
[52] U.S. Cl. ................................ 364/734; 364/575; 364/602
[58] Field of Search ............ 364/554, 575, 602, 605, 364/733, 734, 835; 324/99 D, 142; 235/92 NT

[56] References Cited
U.S. PATENT DOCUMENTS

| 3,538,317 | 11/1970 | Fukuda | 364/835 |
|---|---|---|---|
| 3,553,444 | 1/1971 | Tong | 364/575 |
| 3,783,392 | 1/1974 | Drake et al. | 235/92 NT |
| 3,807,630 | 4/1974 | Stewart | 364/734 |
| 3,864,631 | 2/1975 | Zitelli et al. | 324/99 D |
| 3,936,663 | 2/1976 | Taylor et al. | 364/734 |
| 3,976,942 | 8/1976 | Mayfield | 324/142 |
| 4,031,365 | 6/1977 | Ragiotti et al. | 364/575 |

Primary Examiner—Felix D. Gruber
Attorney, Agent, or Firm—Albert C. Nolte, Jr.; Edward B. Hunter

[57] ABSTRACT

A system for converting an electrical signal to a number of pulses and counting those pulses to provide a digital signal related to the average of the original electrical signal. An accurate electronic clock is included to provide time information and to determine the period of measurement and of averaging. Digitized signal, average, and time information are displayed and provided for interfacing with other digital equipment. An output analog signal is derived alternately from the digitized input signal and from its average.

4 Claims, 7 Drawing Figures

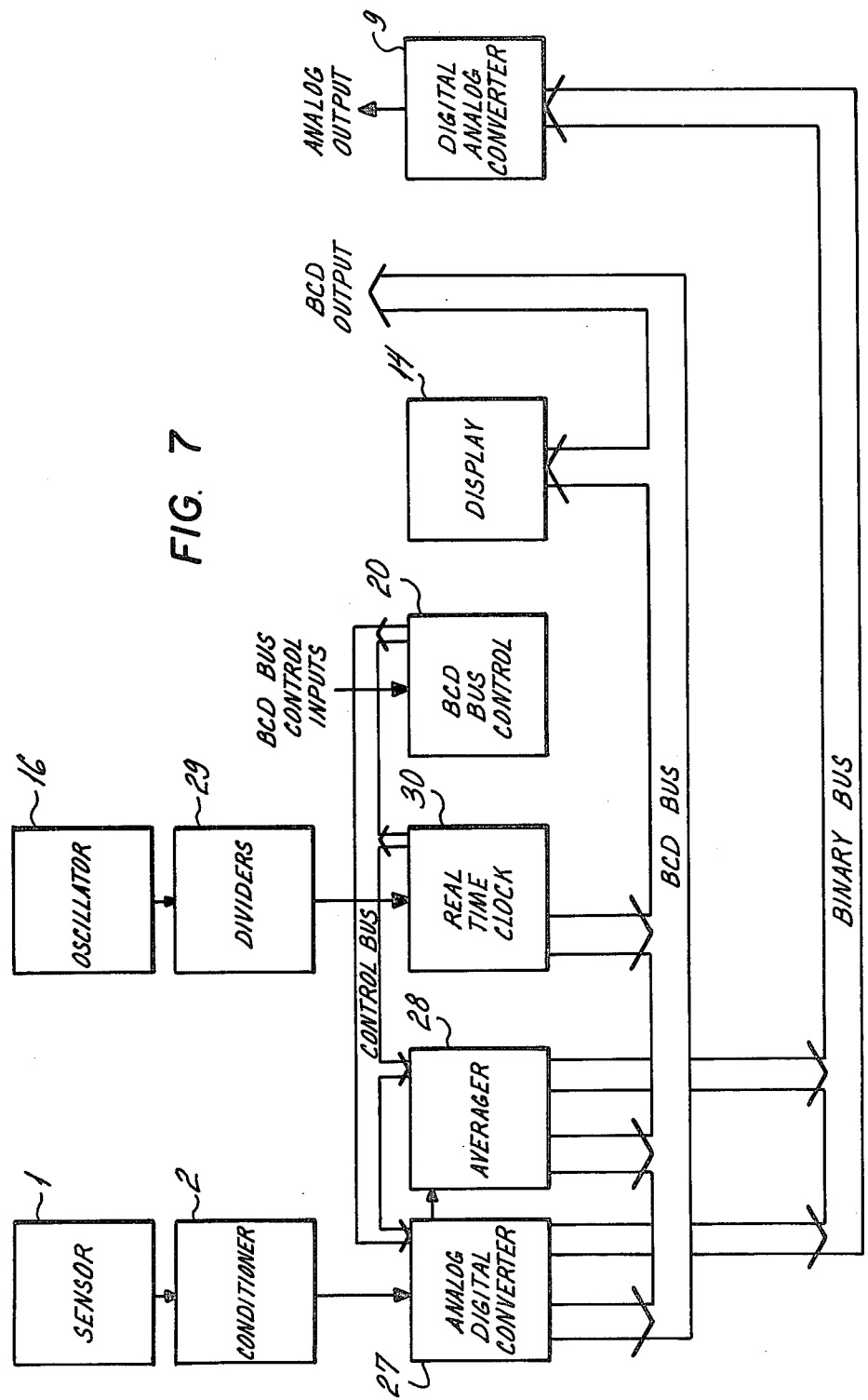

4,199,817

DIGITAL AVERAGER

BACKGROUND OF THE INVENTION

The present application is a continuation-in-part application of Ser. No. 762,553 filed Jan. 25, 1977 and now abandoned.

FIELD OF THE INVENTION

This invention relates to circuitry for averaging dc signals over fixed periods of time with both the beginning of each averaging period and its length controlled by a time-of-day clock. It finds application in the measurement of quantities whose averages over fixed parts of a day are useful. For example, if used with a temperature sensing device and set to average over the 24 hour period from midnight to midnight, the average temperature for each day will be measured, from which average temperature the number of degree days for that day can be calculated. If used with a heat loss sensor, the average heat loss from a building in 24 hours can be determined. If used with a solar energy measuring sensor, the average solar energy falling on the sensor in a 24 hour period can be determined. In each case, knowledge of the average of a quantity over a period permits easy calculation of the integral or total of that quantity over the same period.

DESCRIPTION OF THE PRIOR ART

Several types of averaging of a signal f(t) can be performed. If the signal consists of a series of samples of a quantity that would be constant except for the effect of instrumental fluctuations and noise, several of these samples can be averaged in order to improve the accuracy with which the constant signal can be measured. Here, the average merely "averages out" the fluctuations and noise while not affecting the constant signal.

If the signal does vary with time, a "running average" can be taken, both to average out instrumental fluctuations and noise and to reduce the intrinsic signal fluctuation behavior to a time scale more convenient for subsequent analysis. This running average often consists of filtering out the high frequency components of the signal. The running average can be performed by the familiar RC integrating circuit, providing an output g(t) which is the weighted running average of f(t) 0 to t, with old values of f(t) being given less weight than recent values. Other methods exist to find the running average of f(t) where the weighting function is unity for a fixed period prior to a given time t and zero before that period. In each of these running average methods, the output g(t) is a continuously changing function of time.

One object of this invention is to provide an averager having averaging periods and times controlled by a real time clock.

Another object of this invention is to provide an averager having high accuracy over long averaging periods.

Another object of this invention is to provide an averager having digital display and output in units appropriate to the quantity being averaged.

Another object of this invention is to provide an averager having an analog output capable of alternately corresponding to the signal being measured and to its average.

SUMMARY OF THE INVENTION

The present invention measures the average of a quantity f(t) over a fixed period of time and produces a number which is that average value. This number is read out during the next averaging period, at the end of which the new average replaces the old. During an averaging period this number does not change, always representing the average of f(t) over the previous averaging period.

The present invention measures the average of a quantity f(t) over a period of time, the length of such period and its beginning being controlled by a self-contained time-of-day clock. One hour averages, 6 hours averages, 24 hour averages, and others, can be obtained, beginning at midnight, at 1 a.m., at 2 a.m., etc.

This invention provides apparatus including a sensor which converts the physical variable to be measured to an electrical signal, signal conditioning circuitry to standardize the electrical signal, an analog digital converter, a digital averager of controlled period and starting time, a digital real time clock which controls the averaging period, and digital display and outputs. In addition, a single analog output line allows the current value and the average value of the input signal to be displayed alternately on a meter or chart recorder. An uninterruptable power supply is provided to avoid loss of average information during short external power failures.

BRIEF FIGURE DESCRIPTION

In order that the invention will be more clearly understood, it will now be disclosed in greater detail with reference to the accompanying drawings, wherein:

FIG. 7 is a simplified block diagram of a system in accordance with the invention, for purposes of explanation thereof, and to more clearly explain the operation of the system of the invention.

DETAILED DESCRIPTION OF THE INVENTION

Figure 1:
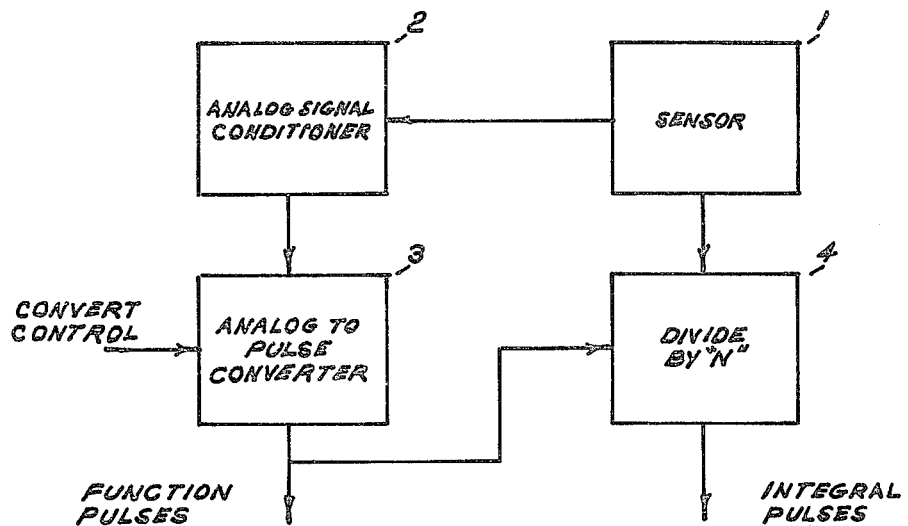
FIG. 1 is a block diagram of a portion of the circuit of the invention, for producing pulses corresponding to a quantity and to the average of a quantity.

Referring first to the overall system of the invention, as shown in FIG. 7, the input signal from sensor 1, which may be an outdoor temperature sensor, is converted to a convenient voltage range, such as from zero to ten volts, by a signal conditioner 2. Analog to digital converter 27 produces a parallel digital signal proportional to the conditioned voltage, and under control of the BCD bus control inputs 20, can place this digital signal on a BCD bus. The BCD bus consists of a number of binary coded decimal lines, this number being appropriate to the accuracy required of the instrument; each decimal digit requiring four lines. An accuracy of 0.1% would require three decimal digits or 12 lines. Analog digital converter 27 also sends digital information to averager 28 which accumulates the average value of the input signal over a period of time controlled by the time-of-day or real time clock 30. Averager 28, under control of the BCD bus control 20, can place a parallel digital signal proportional to the average of the input voltage on the BCD bus.

Oscillator 16 and dividers 29 provide one pulse per second to the time-of-day clock which digitally measures seconds, minutes, hours, days, etc. The clock produces, at appropriate intervals, signals which initiate the measuring process in the analog to digital converter, (typically once each second), control the operation of the averager (generating a 24 hour averaging period in the case of the above mentioned temperature measurement), and provide a parallel BCD output to the BCD bus under the control of the BCD bus controlleer 20.

BCD bus control 20 accepts inputs from front panel switches or external control lines (not shown) to determine whether the output of the analog-digital converter, the averager, or the clock will appear on the BCD bus, and therefore on the display and output lines.

Display 14 converts the parallel lines of the BCD bus to seven segment decimal displays which can be read from the front panel of the instrument. The BCD output makes information on the parallel BCD bus available to external equipment such as computers, printers, etc.

Digital-analog converter 9 provides an analog signal at the analog output suitable for use with a chart recorder. Under control of the time-of-day clock, this signal corresponds to the value of the input signal or to the value of its average over a fixed period. In the case of a temperature measurement, the analog output might correspond to the outdoor temperature for most of the day, but for a short period just after midnight it may be controlled to correspond to the average temperature for the previous day. This would allow both temperature and average temperature to be read from a single chart recorder.

The invention will now be disclosed in greater detail with references to FIGS. 1 to 6, which correspond to different functional portions of the system. It will be noted that the functional relationships of the systems, as represented in FIG. 7, are not directly followed in the detailed block diagrams, in order that the detailed portions of the invention may be more clearly understood. Thus, for example, FIG. 1 corresponds to a portion of the analog to digital converter 27, as well as to a portion of the averager 28 of FIG. 7. This should, of course, be borne in mind when relating the system of FIGS. 1 to 6 to the overall system of FIG. 7.

With reference to FIG. 1, a sensor 1 converts a physical quantity such as temperature, light intensity, weight, air velocity, or other quantities into an electrical signal which is amplified and shifted to a convenient range of electrical voltage by analog signal conditioner 2. The voltage from analog signal conditioner 2 is converted to a number of pulses of fixed amplitude and length by analog-to-pulse converter 3, the number of said pulses being proportional to the afornentioned voltage. The initiation of a conversion cycle is provided by a convert control pulse, thus determining the rate at which measurements are made. Each convert control pulse initiates a measurement cycle by allowing analog-to-pulse converter 3 to convert the present value of the voltage from analog signal conditioner 2 to a train of pulses, the number of which is proportional to the aforementioned voltage from analog signal conditioner 2 and thus to the physical variable measured by sensor 1. The number of pulses in the pulse train output of the analog-to-pulse converter 3 is divided by an integer, N, in the divide-by-N block 4. This division allows the scaling of the average of the aforementioned analog voltage. The integer, N, is equal to the number of measurement cycles per averaging period.

Figure 2:
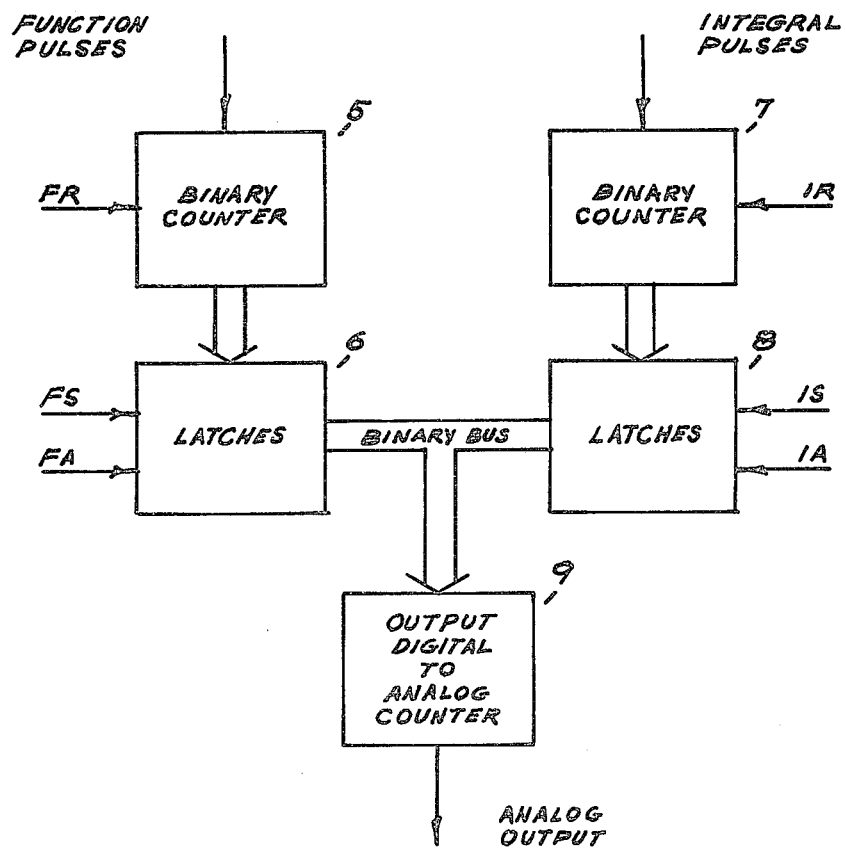
FIG. 2 is a block diagram of a further portion of the system in accordance with the invention, adapted to be directly connected to the system of FIG. 1, and including means for producing and selectively applying binary signals corresponding to the quantity and the average of the quantity to a binary bus.

With reference to FIG. 2, the function pulses of FIG. 1, whose number is proportional to the aforementioned analog signal at the time of measurement are counted by the binary counter 5. At the end of the conversion period, a control pulse FS causes the binary number counted by the binary counter 5 to be read into the latches 6, replacing the data of the previous measurement held by the latches 6. Immediately following the pulse FS, a control pulse FR resets the binary counter 5 to zero. A control voltage FA allows the outputs of the latches 6 to be connected to the binary bus during those periods in which it is desired to have the analog output voltage correspond to the conditional voltage from sensor 1.

Meanwhile, integral pulses from divide-by-N circuit 4 of FIG. 1 are counted by binary counter 7. At the end of an averaging period, which would normally be several (possibly millions) of measurement periods, a control pulse IS causes the data held in the latches 8 to be replaced by the output of the binary counter 7. The output of the binary counter 7 corresponds to the number of function pulses during the averaging period and therefore to the average of the conditioned sensor signal over the same period. Immediately following the pulse IS, a control pulse IR resets the binary counter 7 to zero. A control voltage IA allows the output of the latches 8 to be connected to the binary bus during those periods in which it is desired to have the analog output voltage correspond to the average of the conditioned voltage from sensor 1.

The binary coded signals on the binary bus are converted by the output digital-to-analog converter 9 to an analog signal which is analog output of the instrument and can be recorded on a chart recorder to read on an external electrical meter. The analog output signal corresponds to the output of sensor 1 when the control voltage FA switches the outputs of latches 6 onto the binary bus and corresponds to the average of the sensor 1 output when the voltage level IA switches the output of latches 8 onto the binary bus. In normal usage, it is preferred that the output consists of a voltage proportional to the conditioned sensor output for most of an averaging period, with an output voltage proportional to the average of the conditioned sensor signal being present at the output for a short period after the end of each averaging period.

Figure 3:
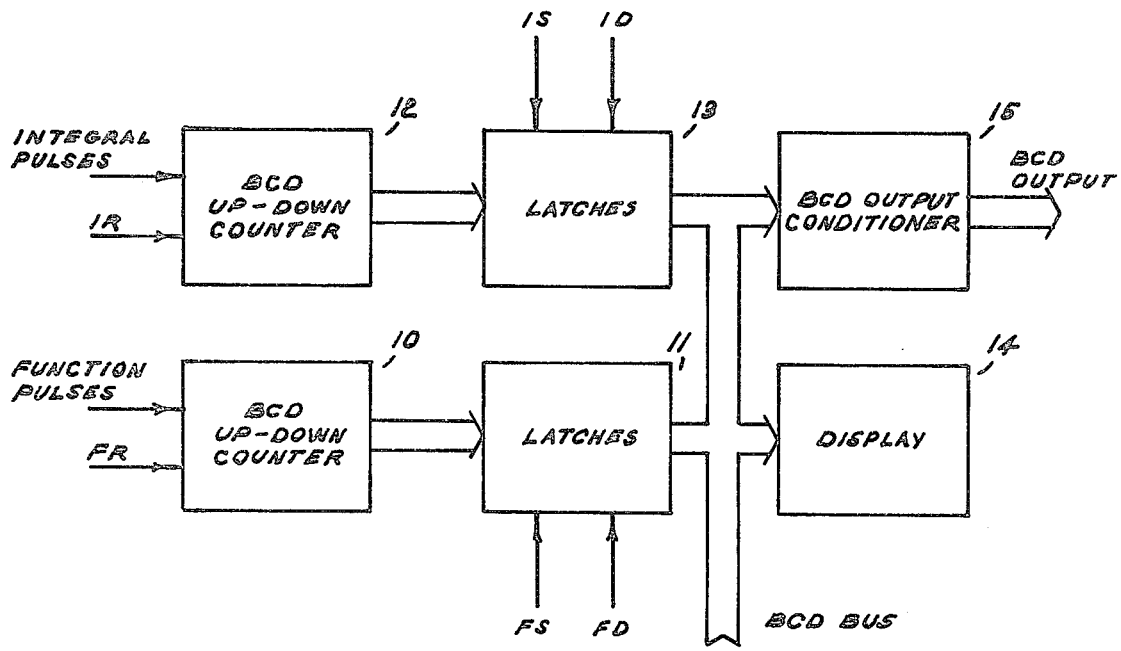
FIG. 3 is a block diagram of a portion of the system of the inventon, adapted to be directly connected to the circuit of FIG. 1 at the corresponding locations, for producing and selectively applying BCD signals to a BCD bus.

With reference to FIG. 3, the function pulses of FIG. 1 whose number is proportional to the conditioned sensor signal are counted in a binary-coded-decimal (BCD) counter 10. Because counter 10 can be preset to a negative or positive number, the binary-coded-decimal output from counter 10 can be a positive or negative number and can be made to correspond to measurement units such as degrees Fahrenheit, degrees Centigrade, kilowatts per square meter, BTU per hour per square foot, or others. At the end of the conversion period, the signal pulse FS causes the binary-coded-decimal number counted by counter 10 to replace the data from the previous measurement in the latches 11. Immediately following the pulse FS, a pulse FR resets the counter 10 to its predetermined positive or negative preset count. The control voltage FD allows the outputs of the latches 11 to be connected to the BCD bus during those periods in which it is desired to have the information displayed by the decimal display 14 and the BCD correspond to the conditioned signal from sensor 1. Meanwhile, the integral pulse from divide-by-N circuit 4 of FIG. 1 are counted by BCD counter 12. The binary-coded-decimal output of BCD counter 12 corresponds to the average of the number of function pulses over the averaging period and therefore to the average of the conditioned sensor signal during the same period. Since counter 12 can be preset to a positive or negative number, the output of counter 12 can be made to correspond to measurement units such as degree-hours, degree days, kilowatt hours per square meter, BTU per square foot, or others.

At the end of an averaging period, the control pulse IS causes the data held in latches 13 to be replaced by the output of the BCD counter 12. Immediately following the pulse IS, the pulse IR resets counter 12 to its positive or negative predetermined preset count. Control voltage ID allows the outputs of latches 13 to be connected to the BCD bus during those periods in which it is desired to have the information displayed by the decimal display 14, and the BCD output, correspond to the integral or average of the conditioned signal from sensor 1.

Display 14 may consist of a number of devices such as seven-segment light-emitting diodes capable of displaying the numerals zero through nine. Depending on the status of control voltages FD, ID, and CD, either the current value of the BCD signal corresponding to the conditioned sensor signal, the average of that signal over the previous averaging period, or the time of day can be displayed by display 14. The BCD output conditioner 15 provides a binary-coded-decimal output compatible with data printers, computers, magnetic recorders, and other digital equipment. Also depending on the status of control voltages FD, ID, and CD, either the current value of the BCD signal corresponding to the conditioned sensor signal, the average of that signal over the previous averaging period, or the time-of-day can be present as binary coded decimal data on the BCD output bus.

Figure 4:
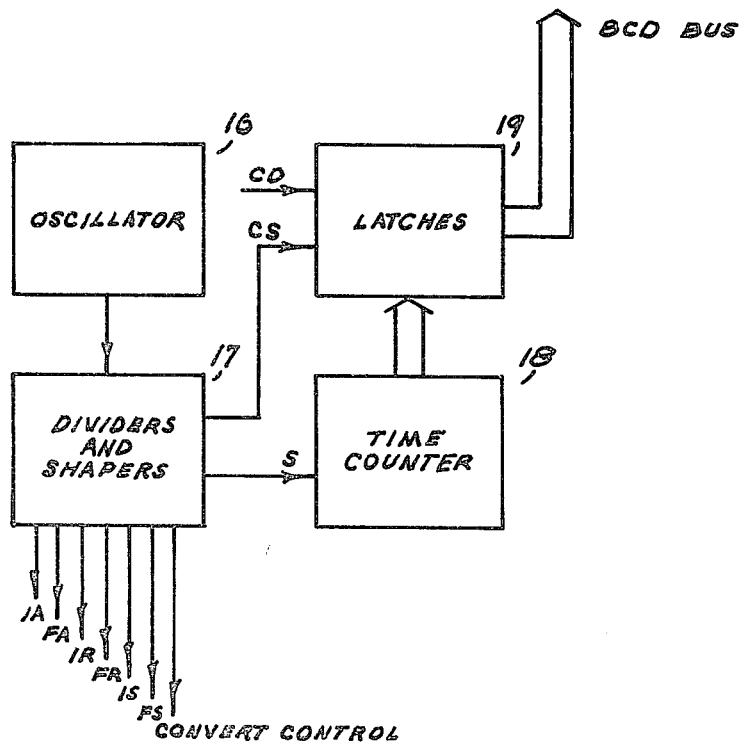
FIG. 4 is a block diagram of a circuit for producing control signals for the circuits of FIGS. 1 to 3.

With reference to FIG. 4, the oscillator 16 provides a high frequency signal of accurately known period which is electronically divided to lower frequencies and is used to produce the control pulses FS, IS, FR, IR, and the control voltages FA and IA. The duration of the measurement period as well as the duration of the averaging period are determined by conventional dividers and shapers 17. In some embodiments of the instrument, the control pulse train can be derived from the oscillator signal by the dividers and shapers 17, under control of the analog-to-pulse converter 3. The dividers and shapers 17 produce a pulse S at intervals of exactly one second. The time counter 18 which effects the functions of the real time clock 30 of FIG. 7 counts the pulses S and has an output in the form of conventional time periods such as seconds, minutes, hours, days, weeks, or months, each in the form of a binary-coded-decimal signal.

Upon the occurrence of pulse CS, binary-coded-decimal data from the time counter replace previous time data stored in latches 19. The control voltage CD allows the outputs of latches 19 to be connected to the BCD bus during those periods in which it is desired to have the time of day displayed by the decimal display 14 and to have the BCD output correspond to time of day information.

It will, of course, be apparent that the various control pulses may be produced at predetermined times, under the control of either conventional hardwire or software systems, in order to effect the desired outputs. It will also be apparent, however, that conventional controls may be employed, if desired, in order to enable an operator to select or control the outputs produced.

Figure 5:
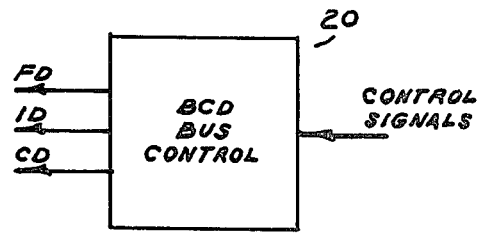
FIG. 5 is a block diagram for producing control voltages for the circuits of FIGS. 1 to 3.

With reference to FIG. 5, BCD bus control 20 accepts control pulses or signals from manual pushbuttons (not shown) on the control panel of the instrument or from a remote computer or controller, to produce control voltages FD, ID, and CD, these control voltages determine whether BCD data on the BCD bus corresponds to the conditioned sensor signal, the average of this signal over the previous averaging period, or the time of day.

It will, of course, be apparent that the control voltages may be produced on the basis of a determined program, such that a record may be maintained without the intervention of operators. Alternatively, manual control of the various intervals of occurrence of the different representations may provide the operator with a degree of control over the operation of the system. The provision of such features, according to conventional practice, is, of course, dependent upon the application of the instrument.

Figure 6:
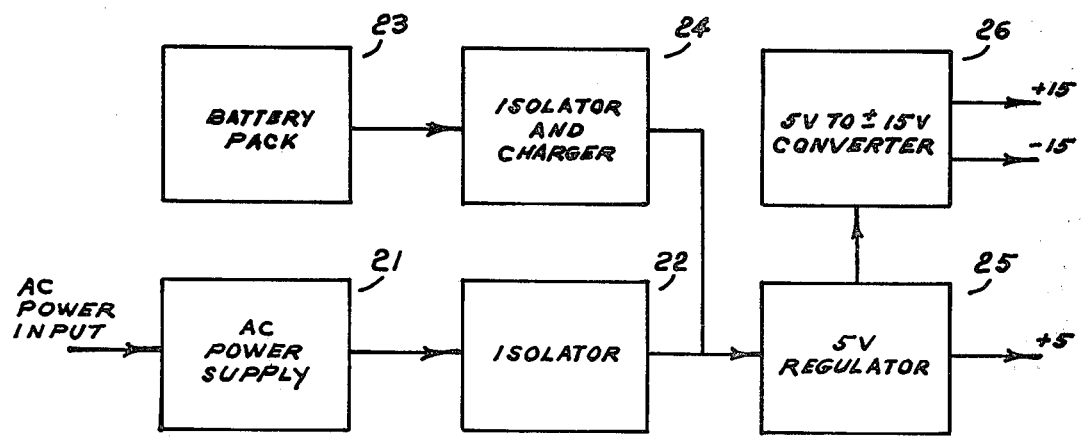
FIG. 6 is a block diagram of a power supply circuit for the system of the invention.

With reference to FIG. 6, the ac power supply 21 accepts alternating current (ac) power from the mains, reduce it in voltage by means of a transformer, rectifies it and filters it by means of a capacitor. The isolator 22 consists of a semiconductor diode or similar device which allows current to flow only when the voltage of the output of the power supply is larger than the voltage of the battery pack. The battery pack 23 consists of rechargeable batteries which serve to power the instrument in the event of a loss of ac input power, in order to prevent loss of average data and time of day information. Isolator-charger 24 consists of a diode in parallel with a resistor allowing a large current to flow only when the voltage of the battery pack is higher than the output voltage of the ac power supply, while allowing a small battery charging current to flow when ac input power is available. The 5 volt regulator 25 accepts unregulated power from the ac supply or battery pack and converts it to accurately regulated 5 volt power. The 5 volt to ±15 volt converter 26 converts a fraction of the 5 volt power to +15 volts and to −15 volts to provide power for other parts of the instrument.

Although several embodiments of the invention have been described, various changes in the form and arrangement of the parts which will be obvious to those familiar with art may be made without departing from the scope of the invention. Reference is, therefore, to be had to the appended claims for a definition of the limits of the invention.

What is claimed is:

1. An averaging system for selectively indicating instantaneous and average values of a quantity, wherein a sensor is provided to produce an electrical signal corresponding to the quantity, said system comprising means for converting said electrical signal to a first binary and first BCD signal corresponding to the instantaneous value of said electrical signal over a determined period, means for producing second binary and second BCD signals, a binary bus, a BCD bus, control means for selectively applying said first and second binary and first and second BCD signals to said binary and BCD buses respectively, and digital display means connected to said BCD bus.

2. The averaging system of claim 1, further comprising means for conditioning said electrical signal before conversion thereof, to a determined voltage range.

3. The averaging system of claim 1, further comprising a digital to analog converter connected to said binary bus to produce analog signals selectively corresponding to the instantaneous or average values of said quantity.

4. The averaging system of claim 1, wherein said control means includes a real time clock.

* * * * *